(12) United States Patent
Sparrell et al.

(10) Patent No.: US 7,231,516 B1
(45) Date of Patent: Jun. 12, 2007

(54) NETWORKED DIGITAL VIDEO RECORDING SYSTEM WITH COPY PROTECTION AND RANDOM ACCESS PLAYBACK

(75) Inventors: Carlton J. Sparrell, Marblehead, MA (US); John A. Watlington, Acton, MA (US)

(73) Assignee: General Instrument Corporation, Horsham, PA (US)

( * ) Notice: Subject to any disclaimer, the term of this patent is extended or adjusted under 35 U.S.C. 154(b) by 973 days.

(21) Appl. No.: 10/411,063

(22) Filed: Apr. 10, 2003

Related U.S. Application Data

(60) Provisional application No. 60/371,839, filed on Apr. 11, 2002.

(51) Int. Cl.
*G06F 1/24* (2006.01)
(52) U.S. Cl. ............... 713/156; 713/161; 713/165; 713/166
(58) Field of Classification Search ........... 713/156, 713/161, 165, 166
See application file for complete search history.

(56) References Cited

U.S. PATENT DOCUMENTS 5,708,961 A * 1/1998 Hylton et al. ............. 725/81
5,781,892 A * 7/1998 Hunt et al. ............... 705/5
5,886,752 A * 3/1999 Cross ...................... 348/724
6,219,409 B1 * 4/2001 Smith et al. ............ 379/106.09

* cited by examiner

*Primary Examiner*—Thomas R. Peeso
(74) *Attorney, Agent, or Firm*—Benjamin D. Driscoll

(57) ABSTRACT

In a multimedia recording and playback network for receiving from a content server a service package of multimedia content, the network including a media server in communication with the content server, a method of securely transmitting a master encryption key from the content server to the media server, including the steps downloading a service package certificate from the content server to the media server, authenticating, in the media server, the received service package certificate, the content server providing to the media server a key server certificate, a public key of the content server, and a client certificate request, the media server authenticating the key server certificate, providing to the content server, upon authentication of the key server certificate by the media server, a client certificate including a challenge signature, and a public key of the media server, the content server authenticating the client certificate including the challenge signature received from the media server, the media server requesting the master encryption key from the content server, and the content server responding by transmitting the master encryption key to media server.

38 Claims, 6 Drawing Sheets

NETWORKED DIGITAL VIDEO RECORDING SYSTEM WITH COPY PROTECTION AND RANDOM ACCESS PLAYBACK

PRIORITY CLAIM

The present application claims priority to co-pending, commonly-owned provisional patent application Ser. No. 60/371,839 filed Apr. 11, 2002, entitled Networked Digital Video Recording System with Copy Protection, Random Access Playback, and Authentication and Provisioning Protocol.

INCORPORATION BY REFERENCE

This application claims the benefit of and incorporates herein by reference the contents of the following applications:

Commonly owned U.S. patent application Ser. No. 09/365,726 filed Aug. 3, 1999, entitled "Multi-Service In-Home Network With an Open Interface", issued as U.S. Pat. No. 6,526,581, incorporated by reference.

Commonly owned U.S. patent application Ser. No. 09/809,770 filed Mar. 16, 2001, entitled "Home Area Network Including Arrangement for Distributing Television Programming Over Local Cable", incorporated by reference.

Commonly owned U.S. Provisional Application for patent Ser. No. 60/193,813, filed Mar. 31, 2000, entitled "Home Area Network", incorporated by reference.

Commonly owned U.S. Provisional Application for patent Ser. No. 60/313,209, filed Aug. 17, 2001, entitled "Delivering Multimedia Over Home Area Networks", incorporated by reference.

Commonly owned U.S. Provisional Application for patent Ser. No. 60/313,228, filed Aug. 17, 2001, entitled "Web Services Provisioning Architecture", incorporated by reference.

Commonly owned U.S. Provisional Application for patent Ser. No. 60/327,627, filed Oct. 5, 2001, entitled "Home Area Network Centralized Video Recorder", incorporated by reference.

Commonly owned U.S. Provisional Application for patent Ser. No. 60/345,966, filed Nov. 7, 2001, entitled "Digital Video Recording System Supporting Concurrent Playback Using Advanced Program Information", incorporated by reference.

Commonly owned U.S. patent application Ser. No. 10/017,675 filed Dec. 15, 2001, entitled "Centralized Digital Video Recording and Playback System Accessible To Multiple Reproduction And Control Units Via A Home Area Network", incorporated by reference.

Commonly owned U.S. patent application Ser. No. 10/032,218 filed Dec. 21, 2001, entitled "Digital Video Recording and Reproduction System And Method Suitable For Live-Pause Playback Utilizing Intelligent Buffer Memory Allocation", incorporated by reference.

Commonly owned U.S. patent Application Ser. No. 02/11,402, filed 11 Apr. 2002, entitled "Centralized Digital Video Recording and Playback System with Seamless Bookmarking and Playback from Multiple Locations via a Home Area Network", incorporated by reference.

Also incorporated herein by reference are the following: *Applied Cryptography*, Bruce Schneier, John Wiley and Sons, 1995; and *Java Cryptography*, Jonathan Knudsen, O'Reilly Press, 1998.

FIELD OF THE INVENTION

The present invention relates to networked digital video recording (DVR) systems, and in particular relates to methods and systems that can be employed in a networked DVR system to provide content protection of persistently stored video and associated audio content.

BACKGROUND OF THE INVENTION

Digital Video Recorders (DVRs) are entering the market as a replacement for tape-based systems such as Video Cassette Recorders (VCR). These systems provide the functionality of allowing a consumer to create digital recordings of television broadcast content, including terrestrial open-air broadcast, Community Access TeleVision (CATV), and satellite. As with earlier tape-based systems, DVR products allow recording of television programs in their entirety for later viewing. It is also common for these products to support time delayed concurrent playback, also known as "elastic" playback or "Live-Pause" playback. Elastic playback allows users to watch television content in real-time as it is being recorded. It also supports "trick play" functions such as Rewind and Pause.

Conventional DVR products are designed to work with a single TV. There are several drawbacks to this approach. For one thing, a DVR requires costly components such as a video encoder (e.g. MPEG-2) and hard drive device (HDD). Another drawback to this approach is that a program recorded local to one TV cannot be played back on another TV. For example, consider a house where a DVR is connected to a television in the living room, and another is connected to a television in the bedroom. A user could record the program in the living room, but the recorded program will reside on the DVR in the living room and cannot be played back in the bedroom.

In contrast to local DVR products, networked DVR systems are described in the patent applications listed above and incorporated herein by reference. One challenge to implementing networked DVR products is to provide a secure mechanism to preventing unauthorized copying of digital video and audio. A content provider, for example, may wish to provide access to recent movie titles on a temporary basis. The content provider may wish to charge a fixed rate for access to this title for 24 hours, using a pricing scheme analogous to movie rental outlets such as Blockbuster and Hollywood Video. A content provider may also wish to provide unlimited access to certain content only to subscribers of that premium content. This content provider may wish to allow a user to record and playback content received from their premium channel, but may not wish to allow this user to share this content in its digital format. With access to broadband Internet connections becoming commonplace, one threat is that a user could disseminate content world-wide by uploading this content to a Web-server.

Conditional access and random access techniques have been proposed or developed. For example, Scientific Atlanta has developed a PowerKey system, and General Instruments (a Motorola company) has developed the Digicipher system. These are methods for encrypting MPEG-2 data on a digital cable TV, providing encrypted keys to that content embedded in the video data stream (ECM or Entitlement Control Message) and providing access control to those encrypted keys using Out Of Band (OOB) channel messages (EMM or Entitlement Management Messages). Neither of these conditional access methods supports persistent storage or time-shifted playing of content.

In addition to the foregoing, NDS Group, PLC has developed a system known as RASP, or Random Access to Scrambled content Process, a mechanism to insert tags in encrypted media files to aid in random access of that media content. This technology is limited to data tagging and is not, by itself, capable of handling networked personal video recording.

While a number of content protection schemes may allow secure storage of media, most, if not all, would interfere with desirable PVR functions such as fast-forward, rewind, and the ability to skip to any position in the program. For example, one approach would be to encrypt an entire MPEG-2 stream without regard to the structure of the data. During playback, the stream could be decrypted as it is decoded/decompressed. This might be adequate for standard play, but consider 15× Fast-Forward where you wish to drop all frames but MPEG-2 I-frames. In this case, one would like to be able to locate and decrypt each I-frame without reading through and decrypting the rest of the data.

Another function made difficult by this approach is random access such as skip-forward 30 seconds, or jump to a specific time-code. Without knowledge of where a restart point is, and what restart point relates to what timecode, the player would be forced to decrypt the stream and parse it.

Therefore, the need exists for a networked DVR system that allows video to be distributed to any television in the home. Further, the need exists for that networked DVR system to provide secure content protection for persistent storage of digital media while still allowing trick-play functionality.

SUMMARY OF THE INVENTION

A solution to the problems of existing digital video recorder systems is provided by the present invention in the form of a networked digital media recording system and method, which includes a copy protection system that prevents unauthorized copying of audio and video, i.e., multimedia, files stored in the system's content storage.

The digital video recording and playback system of the present invention is part of a distributed network. A media server is connected to the network. The media server includes an input port for receiving multimedia content such as cable or broadcast television programming from a multimedia content provider. Preferably the multimedia content would be received in a conventional, encoded/compressed format such as an MPEG-2 content stream (or MPEG-4, H.26L, etc.), but analog might be possible, as well as other formats, which would then be encoded/compressed as MPEG-2 by controlled resources in the network.

The networked system also includes one or more client stations, which have a multimedia player and video display capabilities for displaying selected multimedia files to the user. The present invention may be implemented in a single network that uses video clients, audio clients, PC, and other devices and the various networking schemes may be used, including wireless LANs.

The media server includes an encryption engine for encrypting the multimedia content received from the content provider using one or more content encryption keys. The one or more content encryption keys may be derived from a master key provided by the multimedia content provider. A key manager may be used for generating content encryption keys locally within the media server. The encrypted multimedia content is then stored in persistent video content storage, such as an attached or networked disk drive, in the form of digital files.

At playback, content from the selected multimedia files for playback is transferred from the content storage to the client along with the one or more media encryption keys. The client includes a media decryption engine, which uses the control information and the content encryption key(s) to decrypt the multimedia prior to its being decoded/decompressed for playback in the player.

The system includes an index generator and method for creating an index file of the multimedia content prior to its being encrypted and stored in the content storage. With media in the form of MPEG-2 data files, the index data keeps track of restart points such as sequence headers, so that I-frames and P-frames may be efficiently located in the encrypted data. Restart points are chosen at valid decoder start points, such as a Pack, in a program stream or a packet with the "payload unit start indicator" and 'random access' bits set in a transport stream. Display functions such as fast forward and fast rewind are therefore implemented in an efficient manner by locating, decrypting, decoding and displaying only the MPEG-2 I-frames and P-frames, in the case of 3× fast forward, or only the MPEG-2 I-frames at higher playback rates. In another aspect of the present invention, the index file may be encrypted and stored along with the encrypted multimedia content in the content storage device.

The indexing of the media content provides the capability of trick play and time-shifted-playing of content including elastic playback, live pause, skip ahead, jump to timecode. Start and stop pointers are determined by the media index file and the index manager, so that the system decrypts and decodes/decompresses only that part of the media stream needed for display at the current time for play by the player.

In another aspect of the present invention, the system includes a protocol, which provides for a secure transmission of a master encryption key from the content server of the content provider to the media server of the present invention. The master key is then used by the system's key manager to encrypt content encryption keys used for encrypting the media prior to disk storage. The content encryption keys are generated randomly local to the media server.

These and other features of the present invention will be understood from the description to follow, taken in conjunction with the accompanying drawings.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

In accordance with the present invention, the following is a detailed description of a system and method that can be employed in a whole-home digital video recorder (DVR) to provide content protection of persistently stored video, and associated audio content (hereinafter referred to as "multimedia" or "media"). This content protection relates to home networks, and more specifically, to home networked personal video recording and media distribution including random access and trick-play display of digital streams.

A typical digital recording system stores digital or digitized analog multimedia on a centralized recording medium and supports playback on local or networked devices such as TVs, PCs, "webpads," PDAs, and the like. Audio content and audio portions of multimedia programs may be similarly handled and played back to additional devices such as home stereos.

Copy Protection and Random Access Playback

The copy protection system of the present invention allows content to be securely stored on a recording medium located on the network, and accessed by playback devices located elsewhere on the network. The copy protection allows this content to be accessed in a variety of trick modes, including fast-forward, reverse, live-pause and random-access. This invention protects against cryptoanalysis attacks of the protected media, including known-text attacks and brute-force attacks.

While embodiments of the present invention are described herein in terms of the MPEG-2 format, it will be appreciated that other encoding/compression formats such as MPEG-4, H.26L, are within the scope of the present invention. Therefore, it is to be understood that the use of the terminology MPEG-2 is by way of example only, and is not intended to limit the scope of the present invention.

Figure 1:
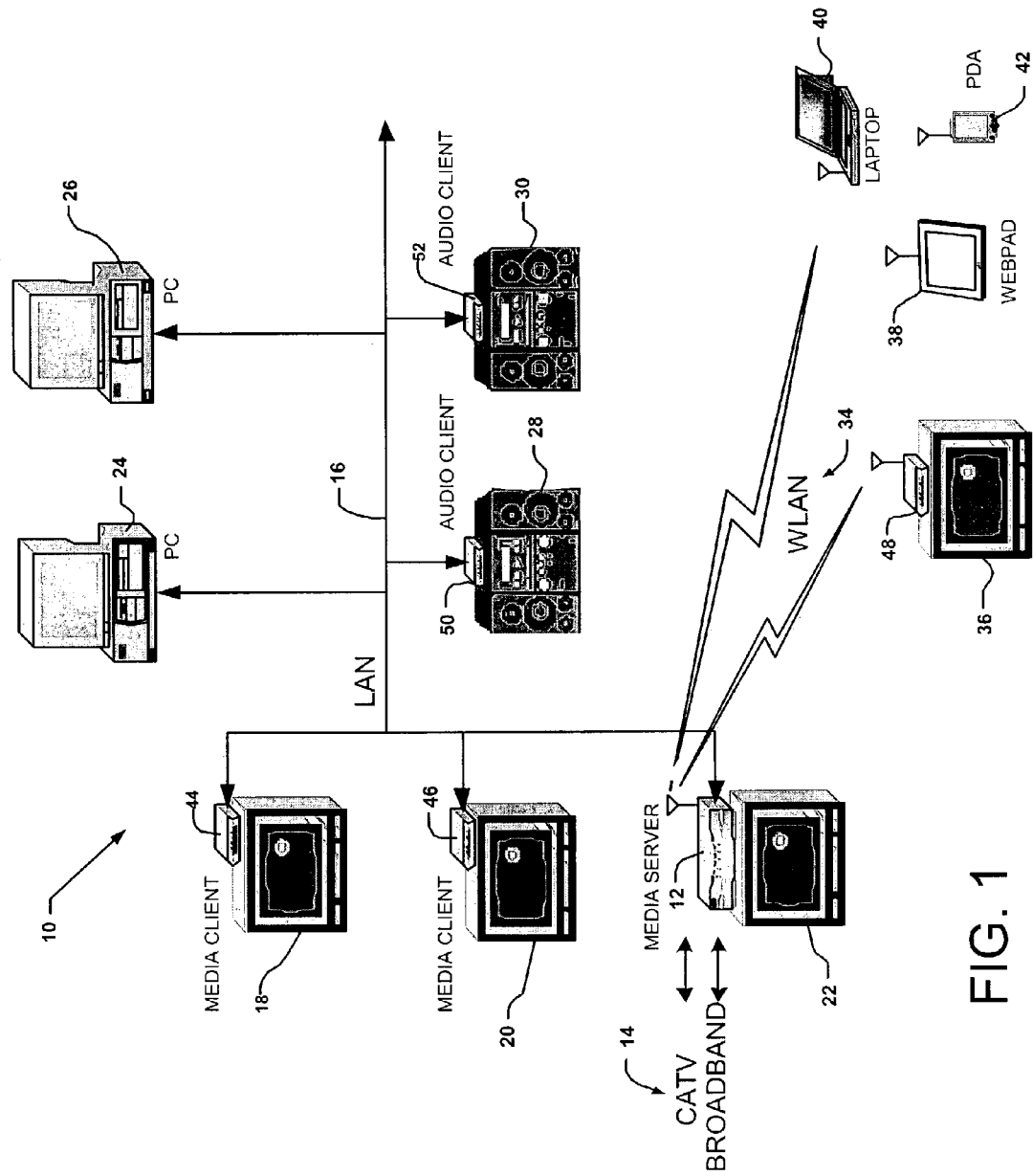
FIG. 1 below illustrates an exemplary home network media storage and distribution system that may be used with the copy protection system and method of the present invention.

Referring initially to FIG. 1, a home-based network 10 is shown, which may use the copy protection system and method of the present invention. The network 10 includes at least one media server 12, which is used for storing audio, video, and data content and serving the content to the various devices across the network 10, which are interconnected using various known LAN and/or WLAN topologies. The media server 12 includes a storage device, typically an internal disk drive, for storing multimedia content in digital form for distribution, as will be described in connection with FIG. 2. The media server 12 includes ports 14 for receiving television broadcast content from one or more sources, such as terrestrial open-air broadcast, CATV, and satellite.

In the embodiment shown in FIG. 1, the network 10 includes various client devices and services such as PCs, webpads, and personal digital assistants (PDAs). The network 10 includes a LAN 16, which interconnects televisions 18, 20, 22, personal computers 24, 26, and audio recording and playback devices 28, 30. Utilizing a wireless local area network (WLAN) capability 34, the network 10 is also shown to support a remote television 36, a webpad 38, a laptop computer 40 and a PDA 42. Communication with the various client devices in the network 10 and control of these devices is through set-top boxes 44, 46, 48 for media clients and set-top boxes 50, 52 for audio clients.

The network 10 can be thought of as a personal video recording and media distribution system, providing audio and video media content to the various client stations connected by LAN and WLAN to the network 10.

Figure 2:
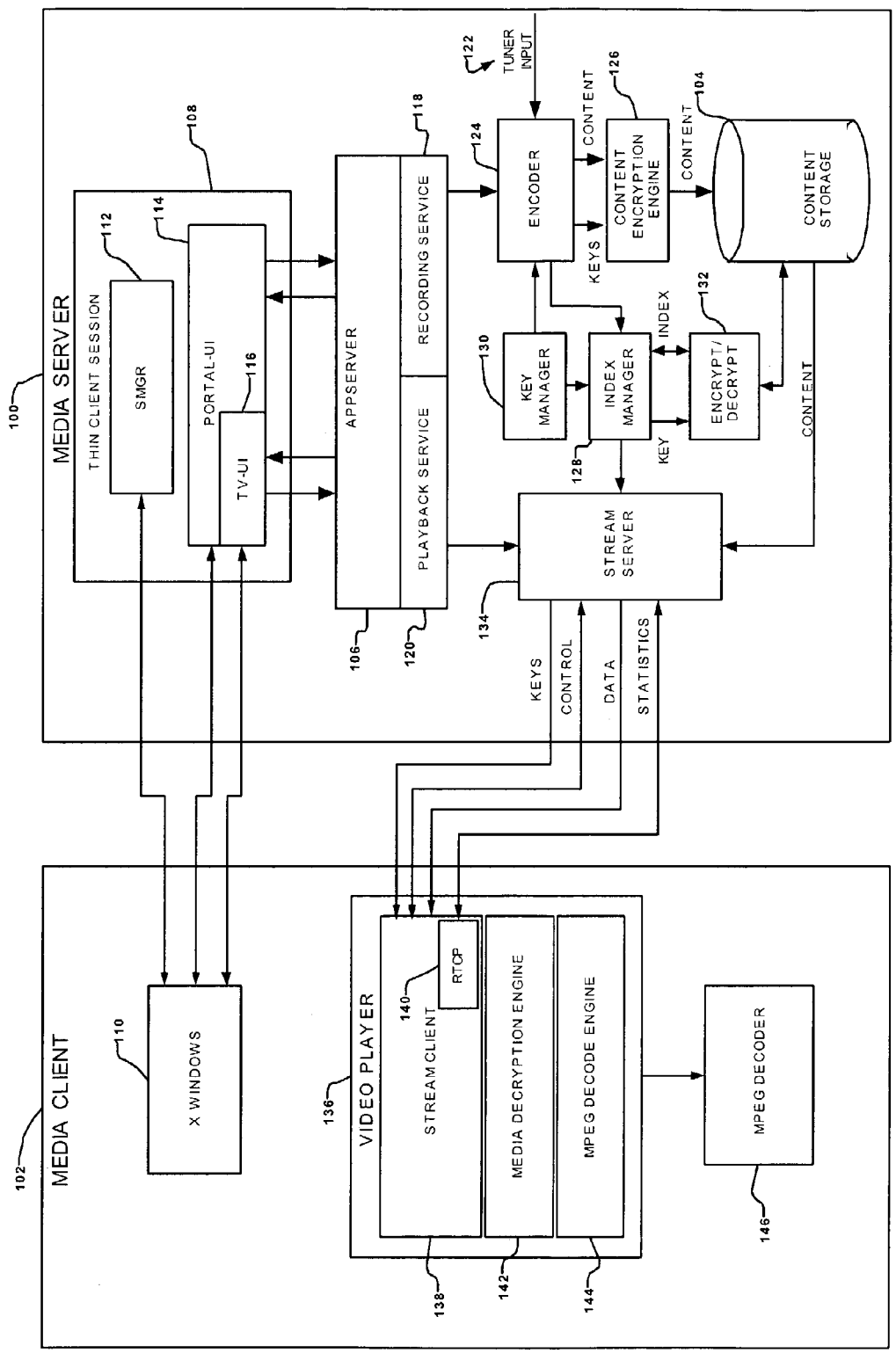
FIG. 2 is a block diagram of an embodiment of the present invention, showing in particular the elements of the media server and media client.

FIG. 2 is a block diagram of one embodiment of the present invention. The system contains a media server 100 and media client 102 functional blocks. The media client 102 function would typically be embodied in the media clients 44, 46, 48 illustrated in FIG. 1. The media server 12 depicted in FIG. 1 can attach to a local television set 22, and would therefore embody both the media server 100 and media client 102 functions depicted in FIG. 2. Note that the audio client devices 50, 52 in FIG. 1 would provide similar functionality to the media clients 44, 46, 48, though handling only the audio portion of an audio-video content stream such as MPEG-2 or MPEG-1 layer-3 (MP3). Further note that other devices, such as PCs, Webpads, PDAs, or even "Internet ready televisions" may embody the media client 102 functions described in FIG. 2.

It should be apparent to those skilled in the art that the embodiments described herein are by way of example. Alternative embodiments may be contemplated in which the functions described as being wholly contained within the media server 100 may instead be distributed across a network. For example, the function of providing persistent storage of media content in the form of a disk drive 104 may be implemented by using networked attached storage. Similarly, the applications and application server, which will be described in what follows, may be hosted on a different device than the media server 100, as well as the encoder and tuner functions.

System operations are typically initiated by user action. In one embodiment, the media client 102 function provides on-screen display and accepts user feedback through an IR or RF remote control. The on-screen display (presented on the television set 18 in FIG. 1, for example) may be generated by remote drawing commands, such as X-windows, or rendering on the media server 100 using a remote frame buffer and transferring the image data (such as VNC remote frame buffer protocol) or by providing script information to be rendered in a browser running in the client (such as HTML and/or Javascript). Many other methods are known in the art.

In one embodiment, the applications are run and managed by an application server 106 in the media server 100. These applications generate drawing commands in a thin (typically X-Windows) client 108 which are transferred and rendered by an X-server 110 running on the multimedia client 102. In this case, as in typical thin-client processes, all screen control is executed by the media server 100 using a screen (window) manager (SMGR) 112 running on the media server 100. Under control of the screen manager 112, the user interfaces—portal-UI 114 and the TV-UI 116—are displayed through the X-server 110 in a manner well known in the art. In an alternative embodiment, the applications can run on the multimedia client 102, and make calls to the services across a network connection such as Berkeley sockets.

The application server 106 provides a number of services that are accessed through an applications programming interface (API). Of particular interest to the current invention are the recording service 118 and playback service 120. The recording service 118 is used by applications to schedule recordings or to record streams for live-pause functionality. The recording service 118 is responsible for issuing commands to control the tuners, encoders and other pieces of the record pipeline. In one embodiment, the recording service 118 can interface with a resource manager (not shown), such as that described in U.S. patent Application Ser. No. 60/350,431, pending as U.S. nonprovisional patent application Ser. No. 02/28,353 and other patent applications listed above and incorporated herein by reference, to gain access to system resources.

The playback service 120 is used by applications to control playback of media streams (audio, video, and/or audio-video) from disk 104, such as prerecorded videos or playback of currently being recorded content for live-pause or elastic-playback functionality. The playback service 120 interfaces with the media server 100, which is responsible for generating streams for playback locally or over the network 10. Again, in a preferred embodiment, the playback service 120 interfaces with a resource manager (not shown), such as that described in U.S. patent Application Ser. No. 60/350,431, pending as U.S. nonprovisional patent application Ser. No. 02/28,353 and other patent applications listed above and incorporated herein by reference, to gain access to system resources.

Multimedia content typically enters the system through a tuner input 122. This content may be analog, such as NTSC, or digital, such as MPEG-2. This content may arrive via CATV, satellite, terrestrial broadcast, fiber to the home (FTTH), etc. This content may also arrive through a modem, typically over an IP or ATM connection over Cable, xDSL, fixed wireless, etc. In the case of CATV, satellite or terrestrial broadcast, the desired RF frequency is selected by the tuner and down-converted to a base-band signal. If the content is analog, the base-band signal will be demodulated and digitized. If the content is digital, the base-band signal will be demodulated and if necessary descrambled from the broadcast conditional access encryption format. If the stream is multiplexed with other content, such as is typical of MPEG-2 transport streams, the stream may be passed through a program identification (PID) filter to select one of more of the component streams. In one embodiment, the transport stream is filtered to provide a single program elementary stream (PES). In alternative embodiments, other encoding or MPEG-2 (or MPEG-4 or H.26L) formats may be used.

The encoder 124 shown in FIG. 2 is responsible for parsing the MPEG-2 program stream, in the case of digital content, or MPEG-2 encoding and parsing the resultant program stream in the case of digitized analog input. The parsing function is typically responsible for locating the restart points and associating them with a time-stamp. Such parsing results in index data that will provide file indexes into the stored encrypted index file. The MPEG-2 content is passed to the content encryption engine 126. The index data that results from the parsing is passed to the index manager 128.

In one embodiment of the invention, the content encryption keys are changed frequently, i.e., multiple content encryption keys are used to encrypt the content stream. In an alternative embodiment, an entire content stream may be encrypted with a single key. The advantage of using multiple content encryption keys is that if one content encryption key is discovered through a successful brute-force attack against a stored media file, that one key will only yield a small portion of the complete file. In a frequent key change embodiment, it is necessary for the index information to provide key index information, indicating which segment of the program stream has been encrypted with what content encryption key. In that case, a key manager 130 is responsible for generating multiple content encryption keys and supplying these keys to the encoder 124. The encoder 124 can then synchronize the transfer of the new keys to the encryption engine 126 with the corresponding data to be encrypted.

The content encryption engine 126 is then responsible for encrypting the program stream using the key(s) provided via the encoder 24, and writing encrypted stream to persistent storage such as a hard drive device 104.

In one embodiment, the index manager 128 operates slightly differently in elastic-playback mode, record mode, and playback than in previously recorded mode. In elastic-playback mode, the stream is being written to disk 104 and read from disk 104 at the same time. The read and write pointers may point to the same position in the stream, as is the case when the user is watching the stream live. The read pointer may also point to some position further back in the file, as is the case when the user pauses, or rewinds a program that is currently being recorded. Since the indexing information is being generated on the fly, and is required by the stream server 134 to perform trick play, the index manager 128 provides an up-to-date table of the index information to the stream server 134 as it is being generated. This may be provided through shared memory, socket connection, or similar mechanism.

In some embodiments of the invention, a "circular buffer" may be used. For example, a file of fixed size may be used to provide limited trick play functionality for a certain time window, such as the most recent 30 minutes. There are many methods of providing a circular buffer known in the art, such as wrapping around to the beginning of the buffer when the end of the buffer is reached. In this case, the buffer appears to applications as a circle where the beginning is the most recently written entry, and the end is the oldest remaining entry that has not been overwritten. Usage of a circular buffer to provide time-shifted video playback is discussed in *The Art of Digital Video*, John Watkinson, Focal Press, Oxford, England 1990, 2d Ed. 1994, incorporated herein by reference. Under this mode of operation, the index manager 128 is responsible for updating the index information to reflect the fact that the oldest information is being lost as new information overwrites it. The index table is continually updated to reflect only what media is currently stored in the circular buffer.

Often a television program will be written to disk 104 with no simultaneous read back. For example, a user may have programmed the recorder to record the news on Channel 5 every night at 7:30 pm. In this case, the function of the index manager 128 is to generate index information that will be associated with the media file stored in persistent storage 104. In the preferred embodiment, the index manager 128 will encrypt the index information, shown as the encrypt/decrypt block 132, prior to this being stored. Encrypting the index information serves several purposes.

First, it allows the keys used to encrypt the content to be stored with the indexes in the encrypted file. This is useful as it eliminates the need for the key manager 130 to keep all keys used to encrypt data stored on the disk 104.

Second, it prevents a known plain-text attack against the encrypted content. If the indexes point to known data structures, such as Group-Of-Picture headers in MPEG-2, the known format of these data structures can be used to facilitate an attack of the encrypted content. In the preferred embodiment, the index information is encrypted with a master key that will be described in greater detail below. The encrypted index information file is associated with the encrypted content file. Several methods for this association are known in the art such as resource forks, directory trees, appending the index file to the end of the content file, etc.

A third function of the index manager 128 is to provide index information for the playback of a previously recorded file. In this case, the index manager 128 is responsible for getting the master key from the key manager 130, decrypting the index file associated with the encrypted data file, and providing the index and key information to the stream server 134. In the preferred embodiment, the stream server 134 and index manager 128 are processes running on the same CPU and can share this information via shared memory. In the case that these processes are running on different hardware, it is preferred that this communication be performed over a secure channel using methods known in the art, such as SSL or TSL.

A fourth function of the index manager 128 is to re-encrypt index file information when the master key used to encrypt these files has expired. In one embodiment, the master key will be changed daily, such that these files need to be re-encrypted daily. An overlap period is provided where a new master key is available before the old master key expires to allow this re-encryption to take place as a background process.

It should be apparent to those skilled in the art that it is possible to view a scheduled recording while the recording is taking place. This is similar to the circular buffer example described above, except that a linear file may be used and that the index information needs to be stored after the completion of the recording. One example of viewing a scheduled recording is described in commonly-owned, co-pending U.S. nonprovisional patent application Ser. No. 10/032,218, filed Dec. 21, 2001.

The stream server 134 shown in FIG. 2 is responsible for providing the multimedia stream to media clients over the network 10 under control of the playback service 120. The stream server 134 receives information from the playback service 120 as to what file to read, what point in the file to play from, what speed to play at (e.g. ½×, 1×, 3×, 15× forward, ½×, 1×, 3×, 15× reverse), and where to play to (e.g., media client 44 or 46 in FIG. 1). In the preferred embodiment, the stream server 134 operates in "push mode" determining which frames to send to the media client, and communicating these frames to the media client 102. At discontinuities in playback (e.g. jump forward 30 seconds) the stream server 134 is responsible for communicating instructions to the media client 102 to flush its buffer and resume at a new frame.

In an alternative "pull mode" embodiment, a process running on the media client 102 is responsible for determining which frames to display and communicating this need to the media server 100.

Several methods for communicating the multimedia stream over the network 10 are known in the art, the most common being Real Time Transport (RTP) for transport and RTP Control Protocol (RTCP) for statistics and QoS control and Real-Time Streaming Protocol (RTSP) for higher-level control. In one embodiment, the stream server 134 is also responsible for communicating the media encryption key(s) to the media client. One method for this is to use a separate secure communications link using methods known in the art such as SSL and TSL. Another method is for the media server 100 to encrypt the key(s) with the client's public key using public/private key encryption. Another method is to encrypt the key(s) using an agreed upon master key, and embedding the encrypted keys in the media stream.

The video player 136 in the media client 102 is responsible for receiving the encrypted content, control information and media encryption key(s) from the stream server 134 media server 100. The video player 136 includes a stream client 138, which includes, in the exemplary embodiment shown, a module 140 for processing RT Control Protocol (RTCP) to convey statistical information and feedback on the quality of data delivery back between the stream server 134 and the stream client 138. The stream client 138 is responsible for receiving this information and passing the encrypted content and decrypted key(s) to the media decryption engine 142.

The media decryption engine 142 decrypts the encrypted content and passes the decrypted data to the decode engine 144 (typically MPEG-2, but many other video encoding methods are known in the art such as MPEG-4 and H.26L). The decode engine 144 is responsible for controlling the (typically MPEG-2) decoder 146 and passing the MPEG-2 stream to the decoder 146. The media decryption engine 142 is responsible, for example, for configuring the playback mode in the case of trick-play, as well as resetting the pipeline in the case of a discontinuity.

In one embodiment, the MPEG-2 stream may be alpha blended with a graphics stream to provide an on-screen GUI with live video playback either using translucency, or picture-in-picture layout.

One encryption method for use with MPEG-2 data is described in the MPEG-2 ISO/IEC standard 13818-1 entitled *Information technology—Generic coding of moving pictures and associated audio information: Systems*. This standard specifies that encrypted MPEG-2 streams should have the entire 'payload' encrypted but leave the higher level headers in the clear. For Program Elementary Streams, for example, this means that the system headers, Pack headers and PES headers remain in the clear, but payload data including video Sequence headers, Group Of Picture (GOP) headers and frame headers will be encrypted. In the preferred embodiment of the present invention, the Sequence headers, GOP headers and Frame headers are also left unencrypted, with encryption being performed on the Huffman encoded video data and slice markers. In the preferred embodiment, the encrypted data is processed to ensure that marker aliasing does not occur. Marker aliasing is a problem where encrypted data streams result in reserved bit sequences such as twenty-three '0' bits followed by a one. The post processing described here ensures that the proper sequence is inserted to retain a valid MPEG-2 data stream, through methods known to those skilled in the art as used to ensure an aliased marker is not generated in the bitstream.

The advantage of leaving the frame headers unencrypted is that the video data can remain encrypted and still be efficiently transmitted across the network even during trick play mode. When a video stream is being viewed at 15-times the normal playback speed, the decoder only needs to play back the MPEG I-frames. By leaving the frame headers in the clear, the stream server 134 is able to determine where the I-frames are in the video stream and only transmit the encrypted I-frames across the network. This prevents the system from having to either send all the video data across the network (requiring 15-times as much bandwidth as normal speed play) or having to decrypt the data to determine which data to send across the network.

A highly useful approach to encrypting MPEG-2 video for trick mode playback is described in the following discussion.

Indexing Encrypted Video for Trick Play Mode Playback

Figure 3:
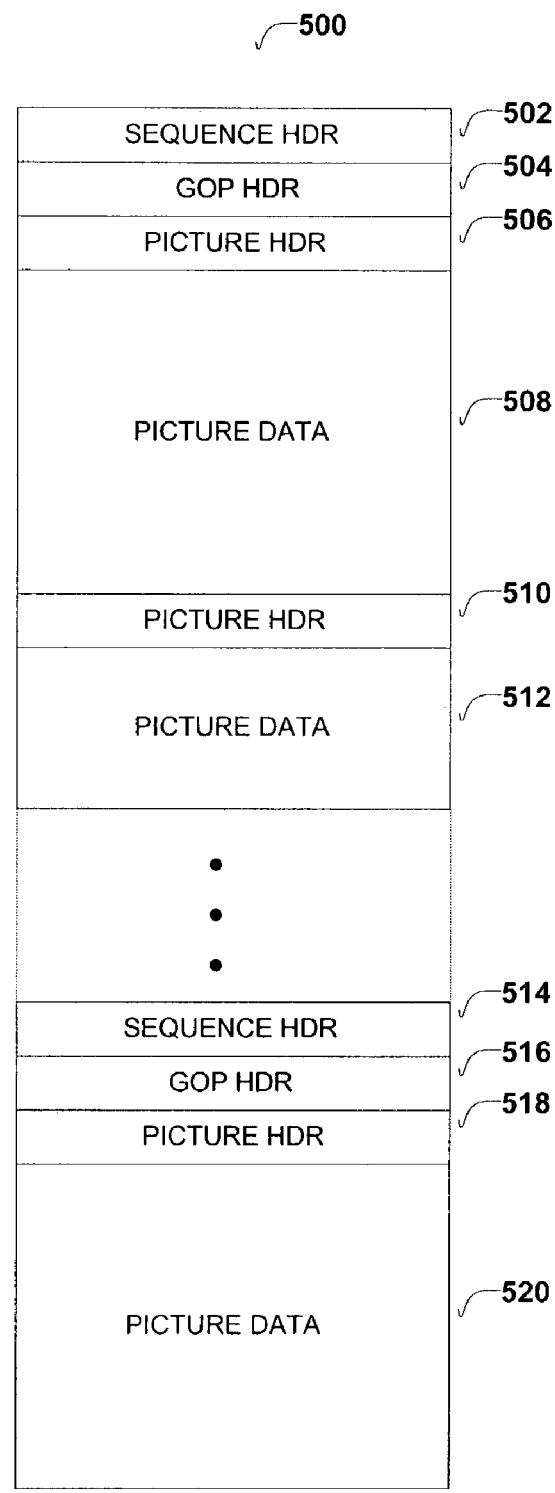
FIG. 3 illustrates a format for MPEG-2 video Elementary Streams.

Referring now to FIG. 3, a simplified format for MPEG-2 video Elementary Streams (ES) 500 is depicted. MPEG-2 streams are often encapsulated inside Packetized Elementary Streams (PES) as generated, for example, by an MPEG-2 encoder. PES data is often further encapsulated within a Transport Stream (TS) as received, for example, by a digital CATV or satellite tuner.

MPEG streams consist of three distinct types of frames: I-frames, P-frames, and B-frames. I-frames are intra coded, i.e., they can be reconstructed without reference to any other frames. P-frames and B-frames, in contrast, are inter coded. P-frames are forward predicted, i.e., represent the difference between the current frame and the closest preceding I- or P-frame. B-frames are both forward predicted and backward predicted, i.e., derive their content from the closest I- or P-frames, one in the past, one in the future. A representative example of a frame sequence from an MPEG stream has the form: IPBBPBB.

Under the MPEG-2 standard, there may be as few as one sequence header (see, e.g., reference numeral 502 in FIG. 3) prior to the first Group Of Pictures (GOP) header 504. The sequence header 502 provides critical information about the stream such as: bit rate, frame size and aspect ratio. The sequence header 502 also contains the quantization matrix. Common encoders insert a sequence header 502 prior to every GOP header 504, but this is not true of all MPEG-2 data.

GOP headers 504, 516 usually provide a time code for the first temporal frame to follow. In the preferred embodiment, time codes are regenerated by frame number in case the GOP time code information is unreliable. The first temporal frame after a GOP header 504 is usually an I-frame. There is also a bit that may be set within the GOP header 504, 516 to indicate if the following GOP is "open" or "closed". A closed GOP is typically used at the beginning of a stream, and usually follows the format IPBBP . . . An open GOP is more common and usually follows the format IBBPBBP . . . . With an open GOP, the two B-frames following the I-frame interpolate from frames prior to the I-frame. This doesn't make sense in circumstances such as the start of a stream where there are no frames prior to the I-frame and this is why the closed GOP format exists. There is also a bit in the GOP header that indicates a broken link. This bit may be set when starting a stream on an open GOP and indicates to the player that the first B-frames should be dropped.

The Picture headers 506, 510, 518 indicate the frame type; I, B or P. Following the picture headers 506, 510, 518 are the picture data 508, 512, 520, respectively. Picture data 512, 508 is terminated by the presence of the Sequence header 514, or Picture header 510 (picture data may also be terminated by a GOP header). The picture data is further segmented into slices and macro-blocks. Note that picture data may be any length, but is padded such that all headers align on byte boundaries.

Figure 4:
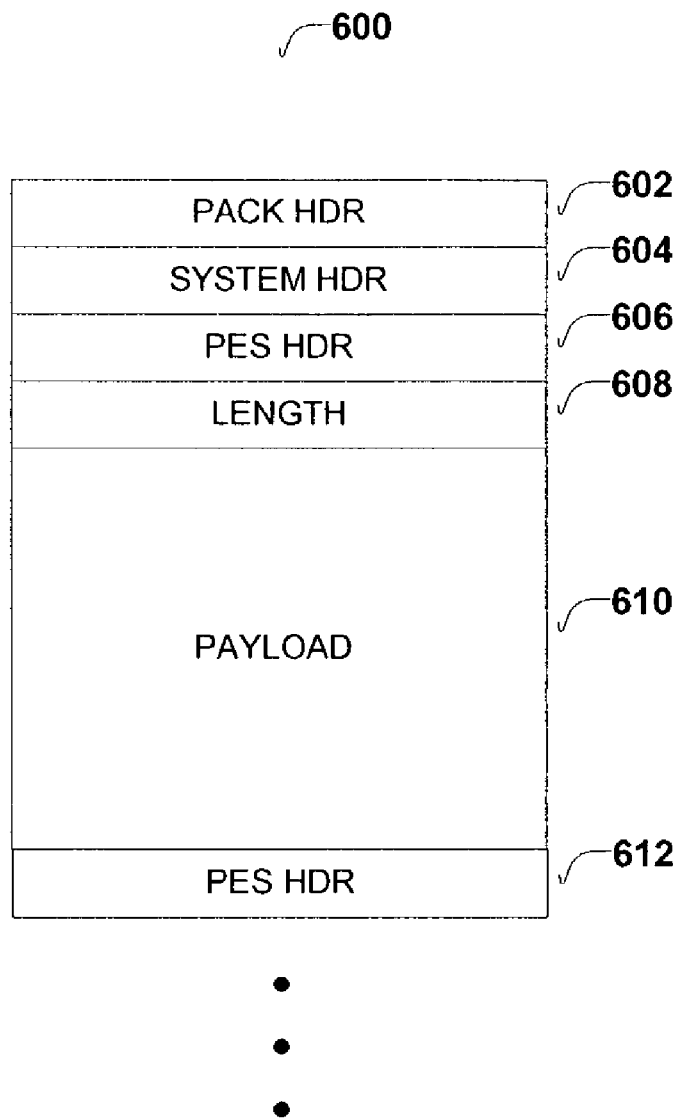
FIG. 4 illustrates the format of Packetized Elementary Streams.

Referring now to FIG. 4, a simplified view of the PES format 600 is presented, a common encapsulation scheme for ES data 500. It is important to note that there need not be any correlation between the ES data 500 and PES data 600—meaning that ES fields may be arbitrarily broken up to packetize them into the PES format 600.

A Pack marker or header 602 indicates the start of a group of packets. A system header 604 and one or more packets follow this. Each packet starts with a PES header 606 that indicates the type of packet (audio, video, etc.). A length field 608 indicating the length of the packet follows the PES header 606. Additional packets may follow starting with a new PES header 612.

The length field 608 is set at 2 bytes, limiting the payload to 64 kB. For practical purposes, this means that a single ES element, such as an I-frame, may be broken up into many PES packets. There may also be additional information in the payload. Typically a timestamp is inserted in a video packet prior to the ES data.

In the preferred embodiment, the index manager 128 parses a PES stream 600 as it exits the encoder 124 and generates indexing information for trick play. The index manager 128 generates the following:

1. Pointers to all PACK headers
2. Offsets from the PACK headers to GOP HDR or SEQ/GOP HDR locations
3. GOP Timestamps relating to the PACK headers The timestamps and pointers to the PACK headers are used for random access. When a request is made to jump to some random time in an MPEG-2 stream, the index manager 128 locates the closest timestamp/PACK entry in the index and starts playing the PES stream from the start of the identified PACK header.

The offsets to the GOP/SEQ headers are used for fast-forward and reverse. In 3× mode, the video player 136 locates I-frames and P-frames and sends the ES picture data for these frames to the decoder 146. In 15× and above, only I-frames are located and sent to the decoder 146. In this networked system, sending only the frames that need to be displayed represents a substantial savings in network bandwidth. It should be apparent to one skilled in the art that providing explicit offset information improves the efficiency of locating the GOP or GOP/SEQ headers following the PACK headers. In one embodiment, the offsets are not generated by the index manager 128 and the GOP or GOP/SEQ headers are found using the pointers to the PACK headers and parsing the bit stream on playback.

In one embodiment, the timestamps stored with the index information are extracted from the GOP header being indexed. In another embodiment, the timestamps are generated by keeping track of the frame number, and using the frame-rate of the video stream to calculate the timestamp from the frame number.

The picture headers 506, 510, 518 and sequence headers 502, 514 delineate the picture data. Once the picture data has been located, it can be encrypted with a number of encryption algorithms known in the art including Data Encryption Standard (DES), 3DES, and Advanced Encryption Standard (AES). Many encryption algorithms operate on fixed block sizes, so in some embodiments padding may be required to bring the picture data size into correspondence with the block size. In one embodiment, an additional step is used to remove reserved bit sequences from the resulting encrypted bit-stream and replace them with an appropriate sequence as is known in the art and specified in the MPEG-2 standards. This step preserves the resulting stream as a legal MPEG bitstream. In one embodiment, the slice headers that typically begin the picture data are replaced with a random field to prevent known-text attack of the resulting bitstream. In another embodiment, the encryption starts following the first slice header to prevent a known-text attack on the resulting bitstream.

In a system where content encryption keys are encrypted by a master key for persistent storage, the security of the content encryption keys, and by extension the content itself, is dependent on a secure method for delivering and managing the master key in a secure way. In one embodiment, each device on the network 10 is authenticated to ensure its integrity. In another embodiment, the master key can be distributed to authenticated devices from a secure key server located outside of the home. One such method is to use a secure key-server located at the service provider's operations center capable of generating and distributing master keys over a secure connection, using a method such as SSL or TSL. Another method is to communicate the master key using what is known in the art as an Entitlement Management Message (EMM), which in cable networks is typically carried on a special frequency channel referred to as the Out-Of-Band or OOB channel. Several methods for local storage and generation of the master key are also known in the art such as storage in secure flash or the use of smart-card security devices.

A highly useful approach for authentication and key management is described in greater detail in the following discussion.

Authentication and Provisioning Protocol

Figure 5:
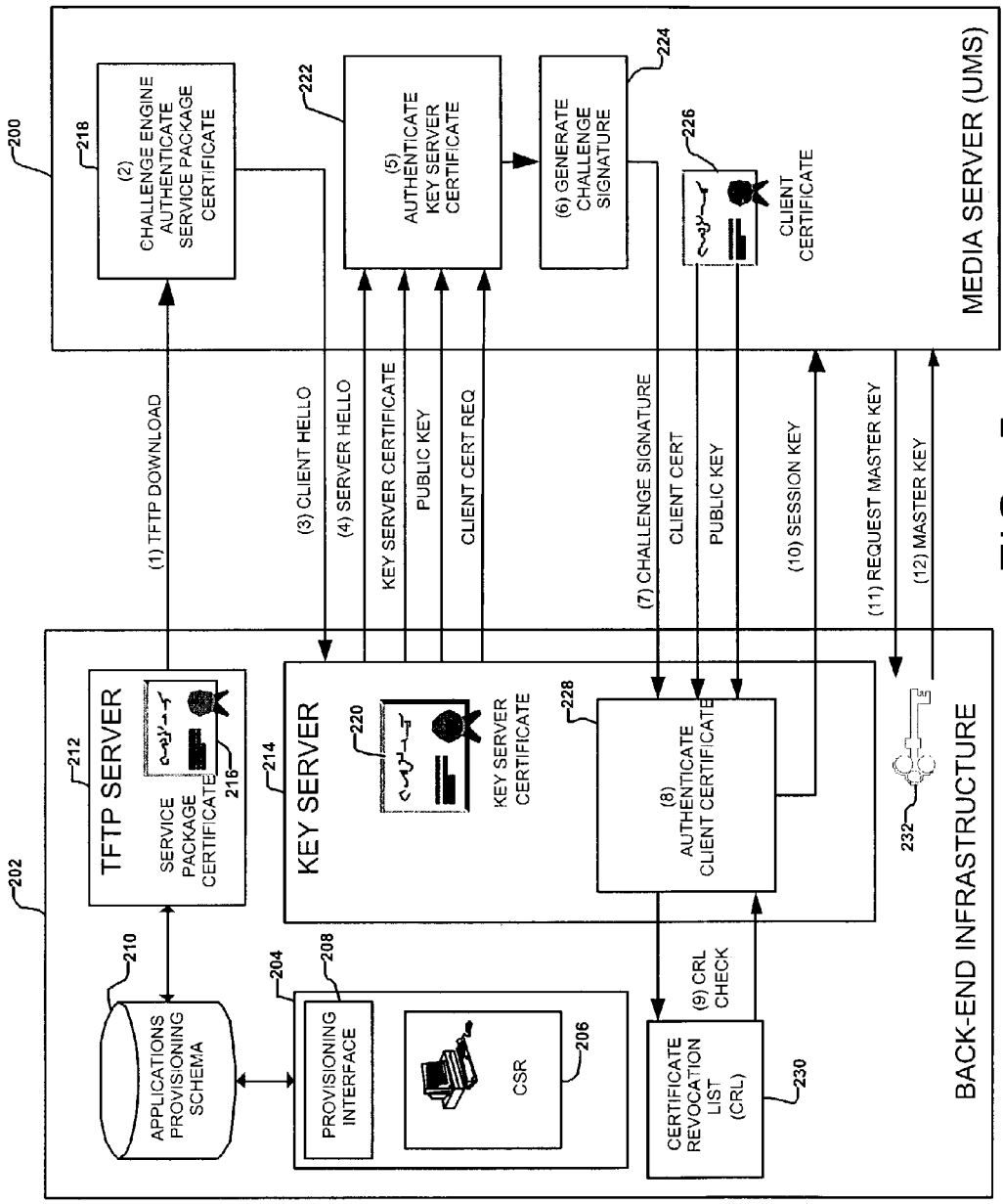
FIG. 5 illustrates the secure protocol and method for authentication and provisioning between a media server and a service provider.
Figure 6:
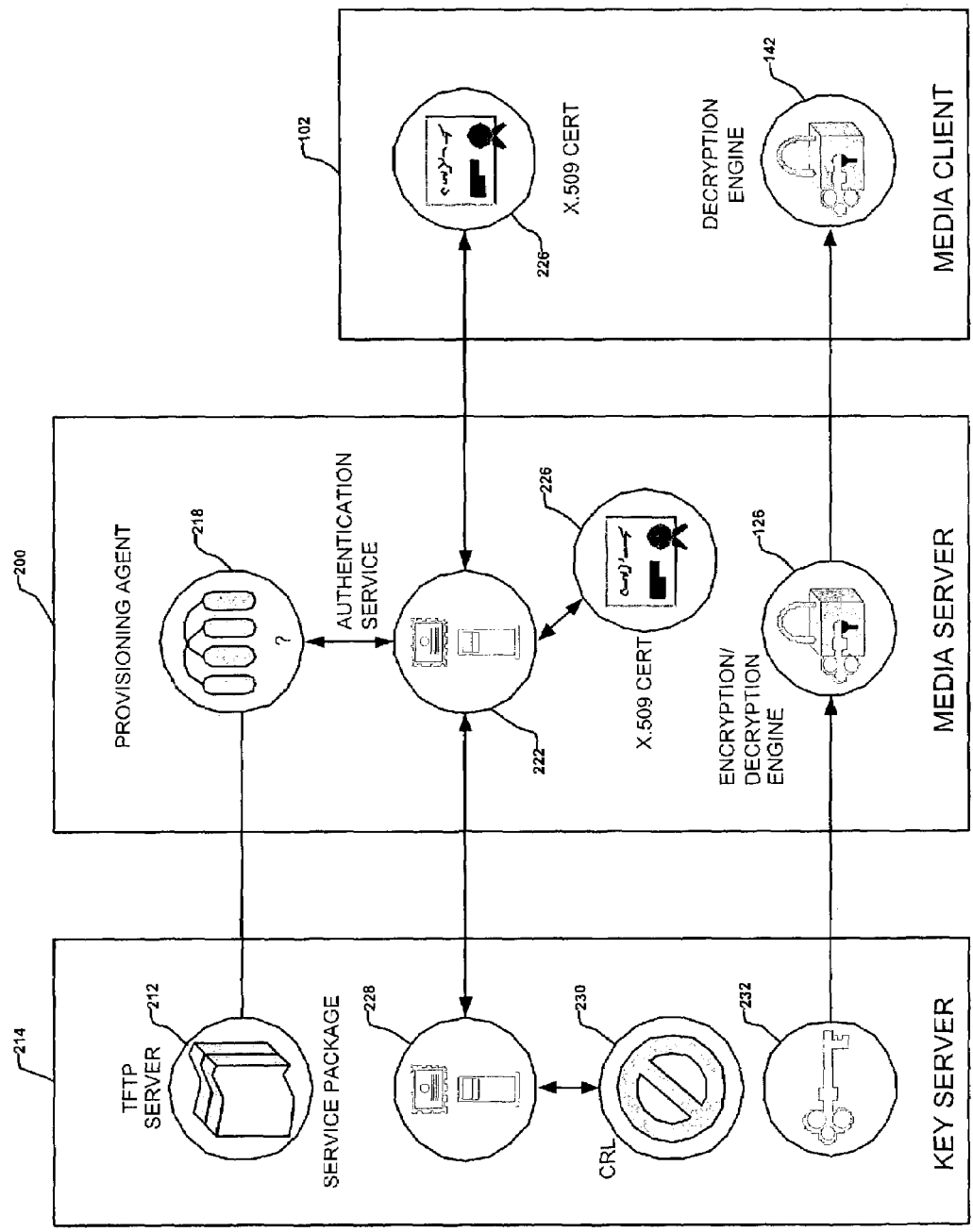
FIG. 6 illustrates a topology for a protocol in which a media server operates in a network with one or more media client devices.

Referring now to FIGS. 5 and 6, a protocol and method for authentication and provisioning between a media server 200 and a service provider's back-end infrastructure 202 will now be discussed in detail.

As shown in FIG. 5, the service provider infrastructure 202 includes a provisioning facility 204, which may include a Customer Service Representative (CSR) 206 for receiving orders from a subscriber for the services to be supplied or provisioned to the subscriber system (via the media server 200). The total of these services defines the subscriber's service package. A provisioning interface 208 allows the CSR 206 to authorize and activate the service package in the system's application provisioning schema 210. A provisioning file is then downloaded, typically, by means of a Trivial File Transfer Protocol (TFTP) server to the subscriber's media server 200.

One of the limitations of conventional back-end infrastructure 202 is that it is typically based on mapping a provisioning file to a hardware address (e.g., Ethernet MAC). When a home device, such as a cable modem, boots up, it downloads this file. In some cases, this file is a complete executable image. This file typically indicates provisioned services such as allowed bandwidth usage, or number of connected devices allowed in that home. However, the server providing this file typically uses an insecure protocol, such as TFTP. This protocol provides limited means for authentication, and no means for key management. This leads to security and/or authentication problems of the type described above.

Accordingly, the novel protocol and methods described below utilize the existing provisioning pipeline to enable backwards compatibility, while allowing additional security services to be provided. The protocol and methods described below have been designed to meet the following requirements:

Authentication:
  Mechanism to provide unique identity to the media server 200 and media client(s) 102.
    Mechanism to authenticate this unique identity.
      Verify authenticity of certificate(s)
      Verify hardware signature matches certificate
        Prevent spoofing on alternate hardware
      Verify software signature matches certificate
        Ensure code has not been modified
      Verify certificate uniqueness
        Prevent masquerading by certificate theft
      Verify certificate against a Certificate Revocation List
        Ability to block revoked certificates
  Mechanism to prevent connection of the media server 200 to unauthorized (backend) server
    Mechanism to authenticate identity of the media server 200
      Verify authenticity of certificate chain
  Mechanism to prevent connection of media client(s) to an unauthorized media server 200
    Mechanism to authenticate identity of the media server 200
      Verify authenticity of certificate chain
  Mechanism to prevent connection of unauthorized media client(s) to the media server 200
    Mechanism to authenticate identity of media client(s) 102
      Verify authenticity of certificate chain Provisioning:
  Mechanism to map identity of the media server 200 and/or media client(s) 102 to provisioning certificate
  Mechanism to authenticate certificate validity
  Certificate includes authorized applications and services
  Certificate prompts authentication
  Mechanism to allow real-time upgrade/downgrade of services Copy Protection:
  Mechanism to securely assign session key to the media server 200
    Mechanism to open a secure channel between the media server 200 and backend server
    Mechanism to store session keys in non-volatile memory on the backend infrastructure 202
    Mechanism to current session key securely on-chip in the media server 200
  Mechanism to generate media encryption keys in the media server 200
  Mechanism to securely communicate media encryption key(s) from the media server 200 to media client(s) 102
    Mechanism to open a secure channel between the media server 200 and media client(s) 102
  Mechanism to encrypt and decrypt media content in the media server 200 and/or media client(s) 102
  Mechanism to securely store media encryption keys in non-volatile memory in the media server 200 and media client(s) 102

Media Server Authentication

A media server 200 in accordance with the present invention authenticates over a data link to the back-end infrastructure 202 using an internal or external network modem or interface device, for example an IP link through a Cable Modem Termination System (CMTS) using a cable modem standard such as DOCSIS. The authentication system is capable of working on top of existing security mechanisms, such as the Data Over Cable Service Interface Specifications (DOCSIS, now know as CableLabs Certified Cable Modems) baseline privacy specification.

Referring now to FIG. 5, after network connectivity is established, the media server 200 implements the following method to authenticate and register with a back-end key server 214. (Here, the media server 200 is treated as the client to the backend infrastructure 202, which functions as a server)

1. The media server 200 downloads a Service Package Certificate (SPC) 216 assigned to its unique MAC address from a TFTP server 212.
2. The media server 200 authenticates the SPC 216. Authentication involves verification of an X.509 certificate chain (where X.509 defines one possible standard certificate format); a process well known to those skilled in the art.

3. The media server 200 (authentication client) initiates authentication with the Key Server 214 by sending a Hello message to the Key Server 214.
4. The Key Server 214 responds with a Key Server Hello, the Key Server Certificate 200, a Client Certificate Request, and a Public Key. The public key is used by the media server 200 to encrypt the data field sent in step 7.
5. The media server 200 (authentication client) authenticates Key Server Certificate 200. Authentication involves verification of an X.509 certificate chain; a process well known to those skilled in the art.
6. The media server 200 generates a Challenge Signature based on the challenge data structure received as part of the SPC 216.
7. The media server 200 responds to the Key Server 214 with its Client Certificate 226, the generated Challenge Signature, and its Public Key to be used by the Key Server 214 to transmit the session key to the media server in step 10.
8. The Key Server 214 authenticates the Client Certificate 226 including the Challenge Signature. The client certificate 226 is authenticated by verifying the X.509 certificate chain; a process well known to those skilled in the art. The challenge signature is compared against an expected value either stored at the key server or generated by the key server.
9. The Key Server 214 checks the Client Certificate 226 against the Certificate Revocation List (CRL) 230. The CRL 230 is a list of certificates that have been revoked and/or compromised and should not be authenticated.
10. The Key Server 214 responds with a Session Key to be used for future communications between the key server 214 and the media server 200. Symmetric algorithms are more computationally efficient than public-private key encryption resulting in reduced overhead for future communications. In some embodiments, this step may be skipped and future communications will continue to use the public keys exchanged in steps 4 and 7.
11. The media server 200 requests a Master Key. The master key will be used by the media server 200 to decrypt the content encryption keys associated with stored media files, and used to encrypt content encryption keys for persistent storage local to the media server 200.
12. The Key Server 214 responds by transmitting the Master Key 232 to the media server 200.

The data fields for each of these transactions are described below.

SERVICE PACKAGE CERTIFICATE 216: In the illustrated embodiment, a single Service Package Certificate (SPC) 216 is used for all media server 200 devices in a given region that share a common manufacturer, model, and provision status. The service package certificate 216 may be changed at any time. If the certificate 216 changes, or the media server 200 provisioning status changes, an alert will be communicated to the media server 200 using Simple Network Management Protocol (SNMP) instructing the media server 200 to download a new SPC.

The SPC 216 is primarily a X.509 certificate chain leading back to a Certificate Authority (CA). The CA is some trusted authority such as the equipment manufacturer, service provider, or third party certifying agency. In addition to the X.509 certificate chain, the SPC 216 also contains:

1. A provisioning field
2. A challenge data structure
3. An optional pointer to key server The provisioning field is a list of services that the media server 200 is allowed to enable. This includes not only information about the media server 200 itself, but also for media client(s) interconnected to the media server 200. For example, this field may indicate the maximum number of media client devices that may be attached to this media server 200, or what applications those media clients may access.

In the illustrated embodiment, the challenge data structure is used by the challenge engine 218 of the media server 200. The challenge engine 218 is a resident component of the operating system. The challenge engine 218 uses the challenge data structure to complete an integrity challenge to verify that the media server 200 and/or media server software have not been modified. The challenge engine 218 may be updated on software upgrade. The challenge data structure may be updated at any time by updating the SPC 216.

An example challenge is as follows. The challenge engine 218 is installed on the media server 200, and is capable of performing different secure hash functions (e.g. MD5, SHA-1, etc). The challenge data structure indicates that an SHA-1 hash function is to be used. The data structure also indicates what data fields are to be used to compute the hash. For example, the hash may be constructed using data resident in SRAM, Flash, or even specific function registers in the CPU of the media server 200. Note that even though the SPC is identical for all similar media server 200 devices, the result of the challenge may be different if unique fields are included in the hash. In the illustrated embodiment, all of the fields in the SPC 216 will be self-signed for authenticity.

CLIENT AND KEY SERVER HELLO: The media server 200 and Key Server 214 hello can be implemented similarly to that used in SSL/TSL. These messages provide, among other things, the types of encryption and decryption methods supported by the media server 200 and the key server 214, respectively.

KEY SERVER CERTIFICATE 220: The key server certificate 220 is an X.509 certificate chain starting with a self-signed certificate for the key server 214 and ending with a certificate from a Certification Authority (CA), typically the same CA providing the authority for the SPC. The media server 200 is responsible for verifying each step in the chain, and will maintain the CA certificate key in non-volatile memory. The key server certificate 220 also provides the key server 214 public key.

CHALLENGE SIGNATURE 224: The challenge signature 224 is calculated as described above under the challenge data structure. The challenge signature 224 is inserted as part of the client certificate 226 and protected by the hash function.

CLIENT CERTIFICATE 226: In the illustrated embodiment, the client certificate 226 is unique to each media server 200. The client certificate 226 is an X.509 certificate chain starting with a self-signed certificate and leading back to the CA. The client certificate 226 will be generated using a public/private key-pair stored in non-volatile memory in the media server 200. It will also include a hash of the data provided from the TFTP server 212 and the challenge signature 224. An authentication function 228 is provided by the key server 214 to authenticate the client certificate 226. As part of the authentication process, the key server 214 checks the client certificate 226 against the Certificate Revocation List (CRL) 230 before proceeding.

SESSION KEY: After authentication, the key server 214 may respond with a session key. This session key will be encrypted with the public key of the media server 200. It should be noted that session keys, when used, are established at this point for greater efficiency. Public-Private encryption is computationally expensive. After authentication, a symmetric session key can be provided to speed up subsequent transactions. In this case, the remaining transaction is providing the master key 232, which could be as easily encrypted using the Public-Private key pair. Alternatively, a Kerberos network authentication protocol ticket could be established, which is known in the art.

MASTER KEY REQUEST: In the illustrated embodiment, the Master Key Request must include a record indicating which master key is being requested. The master key 232 will be rotated frequently, but old master keys will be cached for a period of time to facilitate updates by the media server 200 devices that were not on the network 10 when master key updates occurred.

MASTER KEY: The master key 232 is the key that the media server 200 uses to encrypt its locally generated content protection keys. In the illustrated embodiment, the master key 232 is not stored in non-volatile memory or transmitted unencrypted. On power-cycle, the media server 200 will need to re-establish authentication and re-request the master key 232. The master key record must also contain fields for the renew window of the key and the expiration date of the key.

Client Authentication:

Referring now to FIG. 6, a topology is shown for a protocol in which the media server 200 typically operates in a network with multiple media client devices 102. Only one of these devices needs to authenticate directly with the key server 214. This one device will typically be the media server 200, while the client devices 102 will authenticate using the media server 200 as proxy. In some cases, the provisioning information will dictate how many or what type of client devices 102 may be attached. This information will be used by the media server 200 during discovery mode to determine which client devices 102 should be authenticated. The media server 200 will establish a secure link with the client devices 102 to be authenticated and provide a proxy connection to authenticate these devices with the key server 214. The client devices 102 need not receive the master key 232, but will receive content encryption keys in the manner described above.

The above-described embodiments are within the scope of the present invention. Moreover, the embodiments described in detail herein are exemplary of all possible embodiments within the spirit of the present invention, and the discussion of these embodiments should not be construed as limiting the scope of the appended claims. In view of this, it is understood that the above description is illustrative rather than limiting, and that the scope of the invention is defined by the appended claims.

What is claimed is:

1. In a multimedia recording and playback network for receiving from a content server a service package of multimedia content, the network including a media server in communication with the content server, a method of securely transmitting a master encryption key from the content server to the media server, including the steps:

downloading a service package certificate from the content server to the media server;

the media server authenticating the received service package certificate;

the content server providing to the media server a key server certificate, a public key of the content server, and a client certificate request;

the media server authenticating the key server certificate;

providing to the content server, upon authentication of the key server certificate by the media server, a client certificate including a challenge signature, and a public key of the media server;

the content server authenticating the client certificate including the challenge signature received from the media server;

the media server requesting the master encryption key from the content server; and the content server responding by transmitting the master encryption key to media server.

2. The method of claim 1 further comprising the step of: encrypting at least the challenge signature prior to transmitting to the content server.

3. The method of claim 2 further comprising the step of: using the public key of the content server for encrypting at least the challenge signature prior to transmitting to the content server.

4. The method of claim 1 further comprising the step of: encrypting the master encryption key prior to transmitting to the media server.

5. The method of claim 1 further comprising the step of: using the public key of the media server for encrypting the master encryption key prior to transmitting to the media server.

6. The method of claim 4 further comprising the step of: using a session key provided by the content server for encrypting the master encryption key prior to transmitting to the media server.

7. The method of claim 1 further comprising the step of: transmitting, after authentication of the client certificate, a session key to the media server.

8. The method of claim 7 further comprising the step of: encrypting the session key using the public key of the media server prior to transmitting to the media server.

9. The method of claim 1 further comprising the step of: checking, after authenticating the client certificate including the challenge signature received from the media server, the client certificate against a certification revocation list.

10. The method of claim 1 wherein the service package certificate includes a challenge data structure that defines data fields, and further comprising the step of:

generating the challenge signature using the challenge data structure and data available at the media server for populating the data fields.

11. The method of claim 10 further comprising the step of: hashing the populated data fields using a hashing algorithm specified by the challenge data structure to generate the challenge signature.

12. The method of claim 1 further comprising the steps of: encrypting at least the challenge signature prior to transmitting to the content server; and encrypting the master encryption key prior to transmitting to the media server.

13. The method of claim 12 further comprising the steps of:

transmitting, after authentication of the client certificate, a session key to the media server; and using the session key for encrypting the master encryption key prior to transmitting to the content server.

14. The method of claim 13 further comprising the steps of:

encrypting the session key using the public key of the media server prior to transmitting to the media server.

15. The method of claim 12 further comprising the steps of:
using the public key of the content server for encrypting at least the challenge signature prior to transmitting to the content server; and
using the public key of the media server for encrypting the master encryption key prior to transmitting to the media server.

16. In a multimedia recording and playback network for receiving from a content server a service package of multimedia content, the network including a media server in communication with the content server, a system for securely transmitting a master encryption key from the content server to the media server, the system comprising:
means for downloading a service package certificate from the content server to the media server;
means, in the media server, for authenticating the downloaded service package certificate;
means, in the content server, for providing to the media server a key server certificate, a public key of the content server, and client certificate request;
means, in the media server, for authenticating the key server certificate;
means, in the media server, for providing to the content server a client certificate including a challenge signature and a public key of the media server after authentication of the key server certificate;
means, in the content server, for authenticating the client certificate including the challenge signature received from the media server;
means, in the media server, for requesting the master encryption key from the content server; and
means, in the content server, for responding to the master encryption key request by transmitting the master key to media server.

17. The system of claim 16 further comprising:
means, in the media server, for encrypting at least the challenge signature prior to transmitting to the content server.

18. The system of claim 17 wherein the encrypting means in the media server includes the public key of the content server.

19. The system of claim 16 further comprising:
means, in the content provider, for encrypting at least the master encryption key before transmitting to the media server.

20. The system of claim 19 wherein the encrypting means in the content server includes the public key of the media server.

21. The system of claim 16 further comprising:
means, in the content server, for generating a session key and transmitting the session key to the media server; and
means, in the content server, for encrypting the master encryption key using the session key prior to transmitting to the media server.

22. The system of claim 16 wherein the service package certificate downloaded by the media server includes a data challenge structure that defines data fields; and wherein the media server further comprises:
means for generating the challenge signature using the data challenge structure and data available at the media server for populating the data fields.

23. The system of claim 22 wherein the data challenge signature generating means further comprises:

means for hashing the populated data fields using a hashing algorithm specified by the data challenge structure to generate the data challenge signature.

24. The system of claim 16 further comprising:
means, in the content server, for checking the client certificate against a certificate revocation list after authentication of the client certificate.

25. The system of claim 16 wherein the service package certificate downloaded by the media server includes a data challenge structure that defines data fields; and wherein the system further comprises:
means, in the media server, for generating the data challenge signature using the data challenge structure and data available at the media server for populating the data fields;
means, in the media server, for encrypting at least the challenge signature using the public key of the content server prior to providing to the content server; and
means, in the content server, for encrypting at least the master encryption key prior to transmitting to the media server.

26. The system of claim 25 wherein the data encrypting means in the content server includes the public key of the media server which is used to encrypt at least the master encryption key prior to transmitting to the media server.

27. The system of claim 25 wherein the system further comprises:
means, in the content server, for generating and transmitting a session key to the media server; and wherein the data encrypting means in the content server includes the session key which is used to encrypt at least the master encryption key prior to transmitting to the media server.

28. In a multimedia recording and playback network for receiving from a content server a service package of multimedia content, the network including a media server in communication with the content server for securely transmitting a master encryption key from the content server to the media server, the media server comprising:
means for downloading a service package certificate from the content provider to the media;
means for authenticating the downloaded service package certificate;
means for receiving a key server certificate, a public key of the content provider, and a client certificate request;
means for authenticating the key server request;
means for providing to the content server a client certificate including a challenge signature and a public key of the media server after authentication of the key server certificate;
means for requesting the master encryption key from the content server; and
means for receiving and decrypting the master encryption key transmitted by the content server in an encrypted format.

29. The media server of claim 28 further comprising:
means for encrypting at least the challenge signature prior to transmitting to the content provider.

30. The media server of claim 29 wherein the encrypting means includes the public key of the content server.

31. The media server of claim 28 wherein the service package certificate downloaded by the media server includes a data challenge structure that defines data fields; and wherein the media server further comprises:
means for generating the challenge signature using the data challenge structure and data available at the media server for populating the data fields.

32. The media server of claim 31 wherein the data challenge signature generating means further comprises:
  means for hashing the populated data fields using a hashing algorithm specified by the data challenge structure to generate the data challenge signature.

33. The media server of claim 28 wherein the means for decrypting the master encryption key as encrypted by the content provider includes a private key of the media server.

34. The media server of claim 28 wherein the means for decrypting the master encryption key as encrypted by the content provides includes a session key provided by the content provider.

35. In a multimedia recording and playback network for receiving from a content server a service package of multimedia content, the network including a media server in communication with the content server for securely transmitting a master encryption key from the content server to the media server, the content server comprising:
  a service package certificate;
  means for providing to the media server a key server certificate, a public key of the content provider, and a client certificate request
  means for receiving a client certificate including a challenge signature and a public key of the media server from the media server;
  means for authenticating the client certificate including the challenge signature received from the media server; and
  means for encrypting the master encryption key and transmitting the encrypted master encryption key to the media server.

36. The content server of claim 35 wherein the encrypting means includes the public key of the media server.

37. The content server of claim 35 further comprising:
  means for generating a session key and transmitting the session key to the media server; and wherein
  the encrypting means includes the session key.

38. The content server of claim 35 further comprising:
  means for checking the client certificate against a certificate revocation list after authentication of the client certificate.

* * * * *